United States Patent
Kojima

(10) Patent No.: US 9,952,311 B2
(45) Date of Patent: Apr. 24, 2018

(54) RADAR APPARATUS AND METHOD OF REDUCING INTERFERENCE

(71) Applicant: Furuno Electric Co., Ltd., Nishinomiya (JP)

(72) Inventor: Tatsuya Kojima, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 325 days.

(21) Appl. No.: 14/767,203

(22) PCT Filed: Feb. 4, 2014

(86) PCT No.: PCT/JP2014/052498
§ 371 (c)(1),
(2) Date: Aug. 11, 2015

(87) PCT Pub. No.: WO2014/125958
PCT Pub. Date: Aug. 21, 2014

(65) Prior Publication Data
US 2015/0378005 A1  Dec. 31, 2015

(30) Foreign Application Priority Data

Feb. 12, 2013 (JP) ................................ 2013-024927

(51) Int. Cl.
*G01S 7/02*       (2006.01)
*G01S 7/282*      (2006.01)
(Continued)

(52) U.S. Cl.
CPC .............. *G01S 7/023* (2013.01); *G01S 7/04* (2013.01); *G01S 7/282* (2013.01); *G01S 13/9307* (2013.01)

(58) Field of Classification Search
CPC .................................. G01S 7/023; G01S 7/282
(Continued)

(56) References Cited

U.S. PATENT DOCUMENTS 4,135,189 A * 1/1979 Josse .......................... G01S 7/36
342/18
4,328,497 A * 5/1982 Vale .......................... G01S 7/021
324/76.12
(Continued)

FOREIGN PATENT DOCUMENTS

CN     102819011 A     12/2012
JP     H06160512 A      6/1994
(Continued)

OTHER PUBLICATIONS

ISA Japanese Patent Office, International Search Report Issued in Application No. PCT/JP2014/052498, May 13, 2014, WIPO, 4 pages.

*Primary Examiner* — Peter M Bythrow
(74) *Attorney, Agent, or Firm* — Alleman Hall Creasman & Tuttle LLP

(57) ABSTRACT

A radar apparatus and method of reducing interference which can reduce an amount of interference are provided. The radar apparatus transmits a modulated pulse signal and a non-modulated pulse signal. The radar apparatus includes an interference frequency detecting module and a map generating module. The interference frequency detecting module detects an interference frequency that is a frequency of an interference wave, based on reception signals containing a reflection wave caused by either one of the modulated pulse signal and the non-modulated pulse signal. The map generating module generates a frequency map for specifying an interference band that is a frequency band where the interference frequency exists and a no-interference band that is a frequency band where the interference frequency does not exist. A central frequency of at least one of the modulated pulse signal and the non-modulated pulse signal is set based on the frequency map.

7 Claims, 9 Drawing Sheets

(51) Int. Cl.
   *G01S 7/04* (2006.01)
   *G01S 13/93* (2006.01)
(58) Field of Classification Search
   USPC .......................................................... 342/16
   See application file for complete search history.

(56) References Cited

U.S. PATENT DOCUMENTS

| | | | | |
|---|---|---|---|---|
| 4,642,643 | A * | 2/1987 | Wise | G01S 7/36 342/13 |
| 4,679,048 | A * | 7/1987 | Brandsetter | G01S 7/021 342/61 |
| 5,017,921 | A * | 5/1991 | McGill | G01S 7/023 342/159 |
| 5,075,619 | A * | 12/1991 | Said | G01R 23/165 324/76.31 |
| 5,280,288 | A * | 1/1994 | Sherry | G01S 7/023 342/159 |
| 5,345,470 | A * | 9/1994 | Alexander | G01S 7/023 342/101 |
| 6,486,827 | B2 * | 11/2002 | Small | G01S 7/28 342/13 |
| 6,714,286 | B1 * | 3/2004 | Wheel | G01S 7/493 342/128 |
| 7,522,092 | B2 * | 4/2009 | Okai | G01S 7/023 342/159 |
| 9,223,009 | B1 * | 12/2015 | Wasiewicz | G01S 13/24 |
| 2004/0066323 | A1 * | 4/2004 | Richter | G01S 7/023 342/70 |
| 2005/0192016 | A1 * | 9/2005 | Zimmermann | H04W 16/14 455/450 |
| 2006/0109170 | A1 * | 5/2006 | Voigtlaender | G01S 7/023 342/82 |
| 2007/0126622 | A1 * | 6/2007 | Nallapureddy | G01S 7/023 342/92 |
| 2007/0229349 | A1 * | 10/2007 | Kajio | G01S 7/02 342/82 |
| 2008/0106458 | A1 * | 5/2008 | Honda | G01S 7/023 342/59 |
| 2010/0289690 | A1 * | 11/2010 | Dai | G01S 7/062 342/41 |
| 2011/0001661 | A1 * | 1/2011 | Ohnishi | G01S 13/30 342/202 |
| 2011/0279307 | A1 | 11/2011 | Song | |
| 2011/0298651 | A1 * | 12/2011 | Nakagawa | G01S 7/023 342/146 |
| 2012/0313814 | A1 * | 12/2012 | Kojima | G01S 7/023 342/201 |
| 2013/0342383 | A1 * | 12/2013 | Kojima | G01S 13/10 342/134 |

FOREIGN PATENT DOCUMENTS

| | | |
|---|---|---|
| JP | 2656097 B2 | 9/1997 |
| JP | H10160824 A | 6/1998 |
| JP | 2007248215 A | 9/2007 |
| JP | 2009058308 A | 3/2009 |
| JP | 2012103196 A | 5/2012 |
| JP | 2012255755 A | 12/2012 |

* cited by examiner

RADAR APPARATUS AND METHOD OF REDUCING INTERFERENCE

TECHNICAL FIELD

This disclosure relates to a radar apparatus and method of reducing interference, which can reduce an amount of interference.

BACKGROUND ART

Conventionally, various proposals are given regarding radar apparatuses for detecting target objects in a manner that a detection image for a detection range is formed through transmitting radio signals to the detection range of a predetermined area and receiving reflection signals caused by the radio signals. As described in Patent Document 1, such a radar apparatus uses a pulse signal as the radio signal to be transmitted, and the pulse signal is transmitted continuously at a predetermined interval. Conventional radar apparatuses generally use magnetrons as oscillation amplifying elements for generating the pulse signals, based on a view that they can easily obtain a high electric power for transmission.

REFERENCE DOCUMENT(S) OF CONVENTIONAL ART

Patent Document(s)

Patent Document 1: JP2656097B

DISCLOSURE OF THE INVENTION

Problems to be Solved by the Invention

However, magnetrons have disadvantages in having short lifecycle, high level of unwanted emission, and unstable oscillation frequency. Therefore, radar apparatuses using solid elements (semiconductor amplifiers) instead of magnetrons, so-called solid-state radar apparatuses, are started to be used recently.

With the solid-state radar apparatuses, transmission peak power is extremely low compared to so-called magnetron radar apparatuses which use magnetrons. Therefore, to obtain a maximum detection distance equivalent to the magnetron radar apparatuses, the pulse width of the pulse signal to be transmitted needs to be widened. However, if the pulse width is widened, the number of transmission signals mixed in reception signals of other radar apparatuses increases, in other words, an amount of interference with the other radar apparatuses increases, and thus, there is a possibility of causing negative influence in target object detection. Therefore, this disclosure aims to provide a radar apparatus and method of reducing interference, which can reduce the amount of interference with other radar apparatuses.

SUMMARY OF THE INVENTION (1) To solve the above problems, according to one aspect of this disclosure, a radar apparatus for transmitting a modulated pulse signal and a non-modulated pulse signal is provided. The radar apparatus includes an interference frequency detecting module and a map generating module. The interference frequency detecting module detects an interference frequency that is a frequency of an interference wave, based on reception signals containing a reflection wave caused by either one of the modulated pulse signal and the non-modulated pulse signal. The map generating module generates a frequency map for specifying an interference band that is a frequency band where the interference frequency exists and a no-interference band that is a frequency band where the interference frequency does not exist. A central frequency of at least one of the modulated pulse signal and the non-modulated pulse signal is set based on the frequency map.

(2) Only the central frequency of the modulated pulse signal is preferably set based on the frequency map.

(3) The central frequency of at least one of the modulated pulse signal and the non-modulated pulse signal is preferably set to a frequency within the no-interference band.

(4) A frequency within the no-interference band is preferably assigned to the modulated pulse signal before the non-modulated pulse signal.

(5) The interference frequency detecting module preferably determines a type of the interference wave between the modulated pulse signal and the non-modulated pulse signal.

(6) The map generating module further preferably generates the frequency map by using the interference wave that is the modulated pulse signal.

(7) The interference frequency detecting module preferably generates a frequency spectrum for every sweep based on the reception signal, and detects frequencies that are not in correlation with each other as the interference frequencies by comparing the frequency spectra between continuous sweeps with each other.

(8) To solve the above problems, according to another aspect of this disclosure, a method of reducing interference in a radar apparatus for transmitting a modulated pulse signal and a non-modulated pulse signal is provided. The method includes (a) detecting an interference frequency that is a frequency of an interference wave, based on reception signals containing a reflection wave caused by either one of the modulated pulse signal and the non-modulated pulse signal, and (b) generating a frequency map for specifying an interference band that is a frequency band where the interference frequency exists and a no-interference band that is a frequency band where the interference frequency does not exist. A central frequency of at least one of the modulated pulse signal and the non-modulated pulse signal is set based on the frequency map.

EFFECTS OF THE INVENTION

According to this disclosure, the radar apparatus and method of reducing interference that can reduce an amount of interference with other radar apparatuses can be provided.

BRIEF DESCRIPTION OF DRAWING(S)

MODE(S) FOR CARRYING OUT THE INVENTION

Hereinafter, an embodiment of a radar apparatus and method of reducing interference according to this disclosure is described with reference to the appended drawings. A radar apparatus 1 of this embodiment is mainly used as a ship radar equipped in a ship, such as a fishing boat. Hereinafter, the ship equipped with the radar apparatus 1 is referred to as "the ship."

Figure 1:
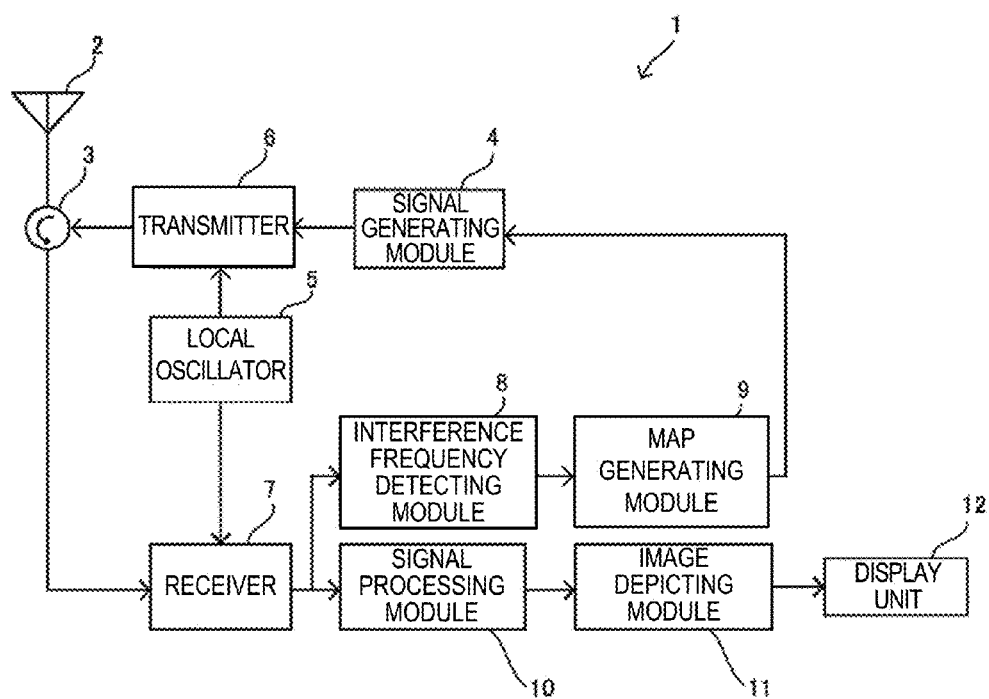
FIG. 1 is a block diagram illustrating a configuration of a radar apparatus according to one embodiment of this disclosure.

As illustrated in FIG. 1, the radar apparatus 1 of this embodiment includes an antenna 2, a transception switch 3, a signal generating module 4, a local oscillator 5, a transmitter 6, a receiver 7, an interference frequency detecting module 8, a map generating module 9, a signal processing module 10, an image depicting module 11, and a display unit 12.

The antenna 2 transmits, as transmission signals, pulse-shaped radio waves respectively having a directivity, and receives reception signals including echo(es) from target object(s) (reflection wave(s)) and radio wave(s) from another radar apparatus (interference wave(s)).

The radar apparatus 1 can find a distance from the radar apparatus 1 to a target object by measuring a period of time from a transmission of a pulse-shaped radio wave by the antenna 2 until an echo is received by the antenna 2. Further, the antenna 2 is configured to be rotatable of 360° within the horizontal plane and repeatedly perform the transception of the radio waves, while changing a transmission direction of each pulse-shaped radio wave. With this configuration, the radar apparatus 1 can detect target object(s) over 360° around the ship on the horizontal plane.

Note that, in the following description, operation performed in a period from a transmission of a pulse-shaped radio wave until a transmission of the next pulse-shaped radio wave is referred to as a "sweep." Further, operation of rotating the antenna 2 by 360° while performing the transception of the radio waves is referred to as a "scan."

In transmission, the transception switch 3 switches its connection such that the transmission signal is transmitted from the transmitter 6 to the antenna 2. Furthermore, in reception, the transception switch 3 switches its connection such that the reception signal received by the antenna 2 is transmitted from the antenna 2 to the receiver 7.

The signal generating module 4 generates the transmission signal and outputs it to the transmitter 6. More specifically, the signal generating module 4 selectively generates a modulated pulse signal and a non-modulated pulse signal, as the transmission signal. A central frequency of the transmission signal to be generated by the signal generating module 4 is set based on a frequency map generated by the map generating module 9 described later. Note that, as a modulation method for the modulated pulse signal, a linear frequency modulation method, a code modulation method, etc., can be given as examples.

The local oscillator 5 generates a local oscillation signal to be used for converting (up-converting) a frequency of the transmission signal outputted by the signal generating module 4 into a radio frequency band, and outputs the local oscillation signal to the transmitter 6. Further, the local oscillator 5 generates a local oscillation signal for converting (down-converting) a frequency of the reception signal from the antenna 2 into a baseband, and outputs the local oscillation signal to the receiver 7.

The transmitter 6 includes a mixer and an amplifier. The transmitter 6 mixes the transmission signal outputted from the signal generating module 4 with the local oscillation signal from the local oscillator 5 by the mixer so as to up-convert the frequency of the transmission signal into the radio frequency band. Further, the transmitter 6 amplifies the up-converted transmission signal by the amplifier and outputs it to the antenna 2 via the transception switch 3.

The receiver 7 includes an amplifier, a mixer, an anti-alias filter, an A/D converter, and a quadrature detector. The receiver 7 amplifies the reception signal received from the antenna 2 via the transception switch 3 by the amplifier, and mixes the amplified reception signal with the local oscillation signal from the local oscillator 5 by the mixer so as to down-convert the reception signal. Further, the receiver 7 removes a signal having a frequency higher than the Nyquist frequency by the anti-alias filter, then samples the reception signal in analog format and converts it into a reception signal in digital format including a plurality of bits by the A/D converter. The receiver 7 outputs the reception signal in digital format to the interference frequency detecting module 8 and the signal processing module 10.

Figure 2:
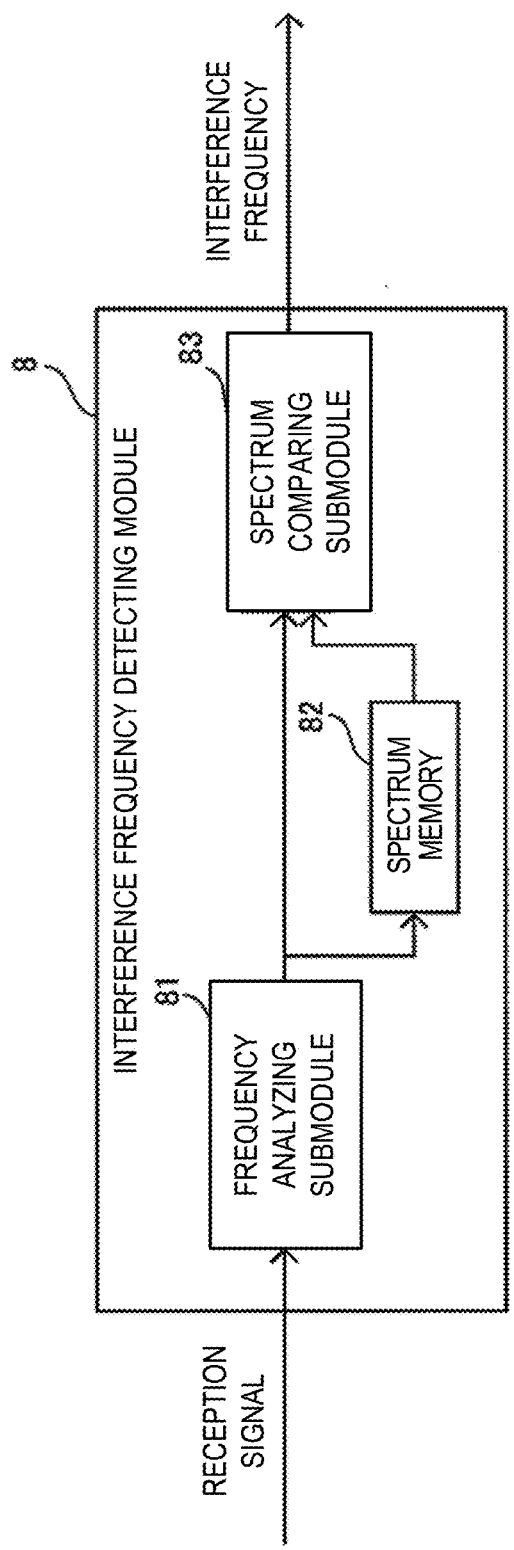
FIG. 2 is a block diagram illustrating a configuration of an interference frequency detecting module according to the embodiment of this disclosure.

The interference frequency detecting module 8 detects an interference frequency which is a frequency of the interference wave, based on the reception signals from the receiver 7. Specifically, the interference frequency detecting module 8 includes a frequency analyzing submodule 81, a spectrum memory 82, and a spectrum comparing submodule 83, as illustrated in FIG. 2. Note that, FIG. 2 is a block diagram illustrating a configuration of the interference frequency detecting module 8 of this embodiment.

The frequency analyzing submodule 81 analyzes frequency components contained in the reception signals for every sweep. Specifically, the frequency analyzing submodule 81 first extracts the reception signals for a predetermined time width in each sweep, and multiplies the extracted signal row by the Gaussian weight. Further, the frequency analyzing submodule 81 Fourier-transforms the signal row multiplied by the Gaussian weight. Thus, the frequency analyzing submodule 81 generates a frequency spectrum for every sweep. Note that, the frequency analyzing submodule 81 outputs the generated frequency spectrum for every sweep to the spectrum memory 82.

The spectrum memory 82 stores the frequency spectra for a plurality of sweeps outputted from the frequency analyzing submodule 81.

The spectrum comparing submodule 83 compares the frequency spectra between continuous sweeps to detect the interference frequencies. For example, the spectrum comparing submodule 83 determines, as echo signals, signals having frequencies within a frequency modulation band of the transmission signal of the radar apparatus 1 and being in correlation with each other between the continuous sweeps, and the spectrum comparing submodule 83 determines that other signals are interference signals. Then, the spectrum comparing submodule 83 detects frequencies of the signals determined as the interference signals, and outputs them to the map generating module 9.

Figure 3:
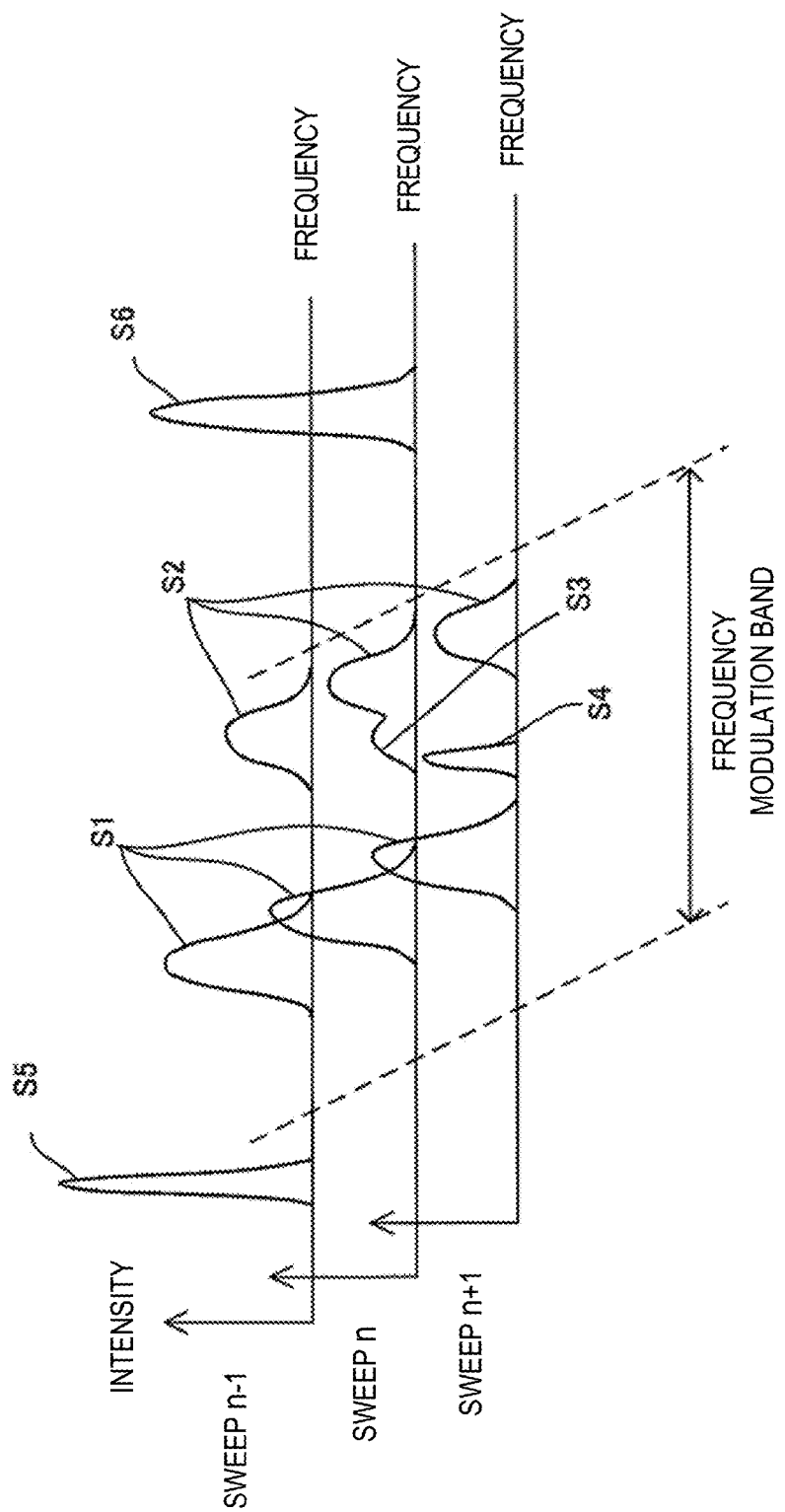
FIG. 3 is a view illustrating frequency spectra for a plurality of sweeps according to the embodiment of this disclosure.

A method of determining the interference signals by the spectrum comparing submodule 83 is described in detail with reference to FIG. 3. FIG. 3 is a view illustrating frequency spectra for a plurality of continuous sweeps. Note that, the range defined by the dashed line in FIG. 3 corresponds to the frequency modulation band.

As illustrated in FIG. 3, signals S1 and S2 are within the frequency modulation band and are in correlation between continuous sweeps. Therefore, the spectrum comparing submodule 83 determines that the signals S1 and S2 are the echo signals. Further, signals S3 and S4 are within the frequency modulation band; however, the signal S3 only appears in a sweep n and the signal S4 only appears in a sweep n+1. Specifically, the signals S3 and S4 are not in correlation between continuous sweeps. Therefore, the spectrum comparing submodule 83 determines that the signals S3 and S4 are the interference signals. Moreover, signals S5 and S6 are not within the frequency modulation band, and therefore, the spectrum comparing submodule 83 determines that the signals S5 and S6 are the interference signals. Note that, the signal S5 only appears in a sweep n−1 and the signal S6 only appears in the sweep n, specifically, the signals S5 and S6 are not in correlation between continuous sweeps. The spectrum comparing submodule 83 may determine that the signals S5 and S6 are the interference signals because of this.

The spectrum comparing submodule 83 detects, for each azimuth, the frequency of each signal which is determined as the interference signal (interference frequency), and outputs them to the map generating module 9. Note that, the spectrum comparing submodule 83 may detect a frequency band of the interference signals and output it to the map generating module 9, or it may detect a central frequency of the interference signals and output it to the map generating module 9.

Figure 4:
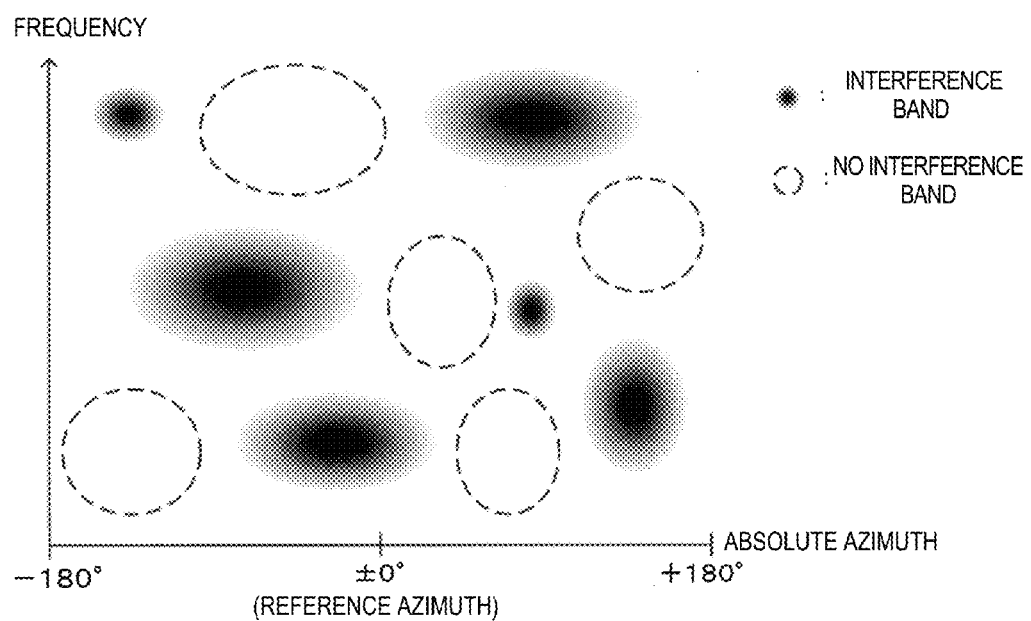
FIG. 4 is a view illustrating one example of a frequency map according to the embodiment of this disclosure.

Based on the interference frequency for each azimuth outputted from the interference frequency detecting module 8, the map generating module 9 generates a frequency map indicating relationship between the interference frequency and azimuth, for example, a map illustrated in FIG. 4. FIG. 4 is a view illustrating one example of the frequency map generated in this embodiment. Note that, the azimuth in the frequency map is preferably absolute azimuth, for example, with respect to North, instead of relative azimuth with respect to a heading of the ship.

Further, in the frequency map, the map generating module 9 sets, as an interference band, the frequency band where the interference wave exists, and sets, as a no-interference band, the frequency band where the interference wave does not exist. Further, when the signal generating module 4 generates the transmission signal to be transmitted to a certain azimuth, the map generating module 9 sets a central frequency of the transmission signal based on the no-interference band in this azimuth and outputs it to the signal generating module 4. In other words, the map generating module 9 sets the central frequency of the transmission signal to a frequency within the no-interference band. The signal generating module 4 generates the transmission signal based on the central frequency outputted from the map generating module 9. Note that, the map generating module 9 may generate the frequency map by differentiating the darkness in gray scale in the interference band such that the color for frequency becomes darker as the number of times that the frequency is detected is larger.

The signal processing module 10 includes an interference removing submodule, a sensitivity adjusting submodule, and a filtering submodule. When the signal processing module 10 determines that the reception signals outputted from the receiver 7 contain the interference waves, it removes the interference waves by the interference removing submodule. For example, the interference removing submodule compares amplitudes of the reception signals between continuous sweeps, obtains correlation between the sweeps, assumes the signals with low correlation as the interference waves, and removes them. Further, the signal processing module 10 adjusts intensities of the reception signals by the sensitivity adjusting submodule.

When the transmission signal generated by the signal generating module 4 is the modulated pulse signal, the signal processing module 10 performs pulse-compression by a matched filter. Further, when the transmission signal generated by the signal generating module 4 is the non-modulated pulse signal, the signal processing module 10 only extracts the frequencies within a required range by a band-pass filter having a passing band of a frequency width that substantially corresponds to an inverse number of the pulse width of the transmission signal.

Based on the reception signal processed by the signal processing module 10, the image depicting module 11 outputs the reception signal in a polar coordinate system to the display unit 12 while converting it into a reception signal in an orthogonal coordinate system. Based on the signal outputted from the image depicting module 11, the display unit 12 displays a radar image on a display screen.

(Interference Reducing Method)

Next, the interference reducing method implemented by the above-described radar apparatus 1 is described with reference to FIG. 5. Note that, FIG. 5 is a flowchart illustrating one example of the interference reducing method of this embodiment.

Figure 5:
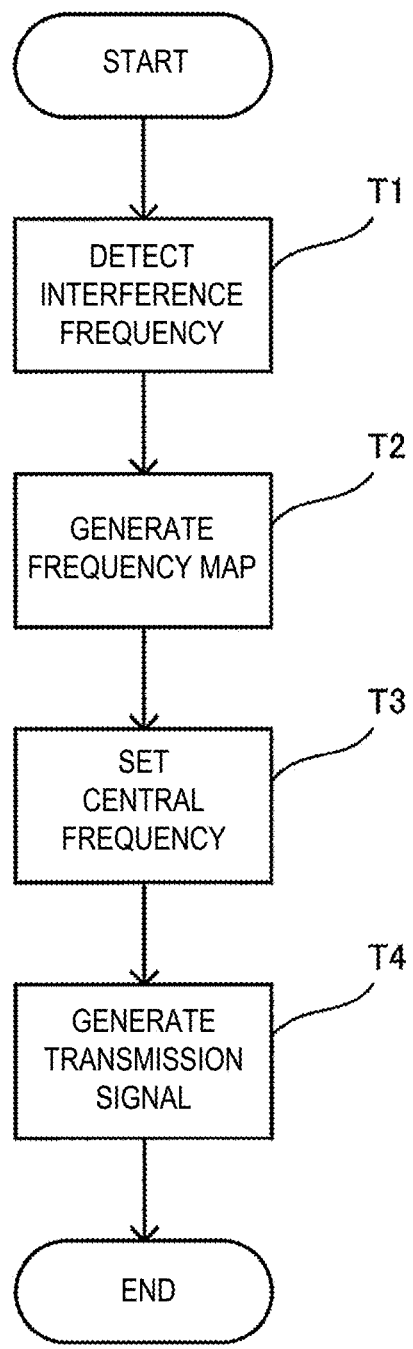
FIG. 5 is a flowchart illustrating a procedure in an interference reducing method implemented by the radar apparatus according to the embodiment of this disclosure.

As illustrated in FIG. 5, first, the interference frequency detecting module 8 detects the interference frequency (Step T1). Specifically, the frequency analyzing submodule 81 Fourier-transforms the reception signals outputted from the receiver 7 and generates the frequency spectrum for every sweep, and each of the generated frequency spectra is stored in the spectrum memory 82. Next, the spectrum comparing submodule 83 obtains the correlation between the continuous sweeps, specifies the signals which do not correlate with each other as the interference waves, and detects the frequencies of the interference waves as the interference frequencies. Further, the spectrum comparing submodule 83 outputs the detected interference frequencies to the map generating module 9 in association with the azimuths in which the interference waves exist.

Next, the map generating module 9 generates the frequency map based on the interference frequency and azimuth outputted from the interference frequency detecting module 8 (Step T2). Note that, in a case of generating a frequency map within an azimuth range between −180° and 180°, although the map generating module 9 can generate the frequency map by only using the reception signals for a single scan, to reduce a larger amount of interference, the frequency map is preferably generated by using the reception signals for a plurality of scans.

The map generating module 9 sets the central frequency of the transmission signal based on the frequency map and outputs it to the signal generating module 4 (Step T3). Specifically, when the signal generating module 4 generates the transmission signal to be transmitted to a certain azimuth, the map generating module 9 sets the central frequency of the transmission signal based on the no-interference band in this azimuth and then outputs the set central frequency to the signal generating module 4.

The signal generating module 4 generates the transmission signal based on the central frequency outputted from the map generating module 9 (Step T4). Note that, the entire frequency band of the transmission signal preferably does not overlap with the interference band in the azimuth to which the transmission signal is transmitted; however, part of the frequency band may overlap with the interference band.

With the radar apparatus 1 configured as above, by generating the interference map, the frequency band where the interference wave exists can be grasped in every azimuth. Therefore, the radar apparatus 1 can generate the transmission signal while avoiding the frequency band where the interference wave exists, and as a result, an amount of interference with the other radar apparatuses can be reduced.

Although the embodiment of this disclosure is described above, this disclosure is not limited to these, and may be applied various modifications without deviating from the scope of this disclosure.

Figure 6:
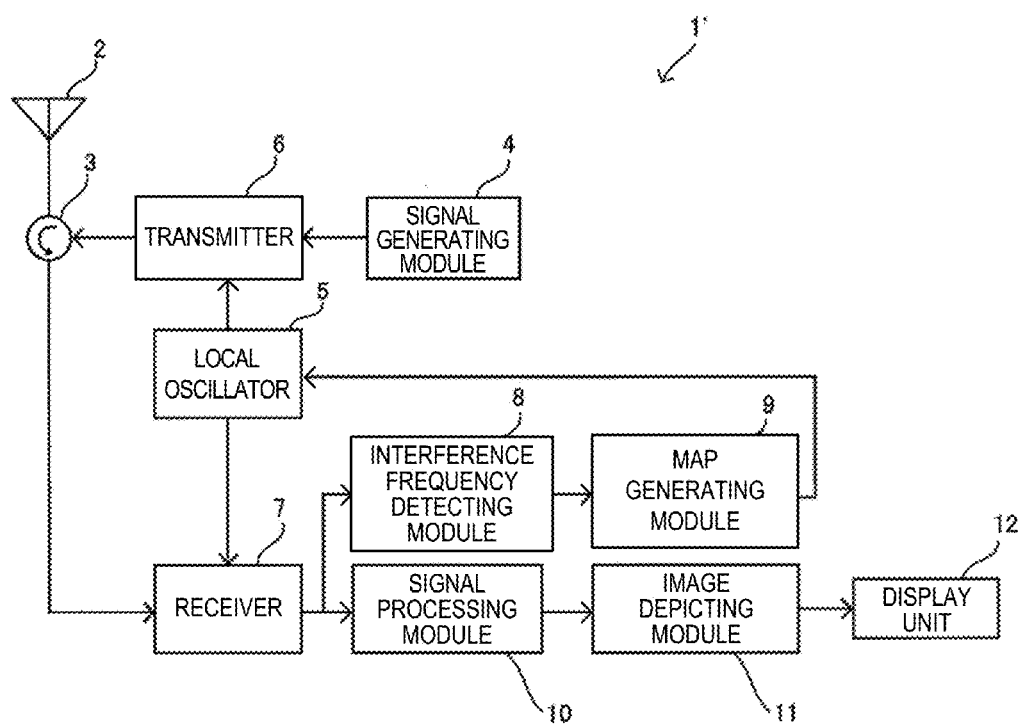
FIG. 6 is a block diagram illustrating a configuration of a radar apparatus according to another embodiment of this disclosure.

(1) For example, as illustrated in FIG. 6, a configuration in which the central frequency of the transmission signal is changed in the local oscillator 5 may be adopted. In this case, for example, the signal generating module 4 generates the transmission signal with a predetermined central frequency without taking the azimuth into consideration. Further, the central frequency of the transmission signal is outputted from the map generating module 9 to the local oscillator 5, and the local oscillator 5 changes the central frequency of the transmission signal based on the central frequency outputted from the map generating module 9.

Figure 7:
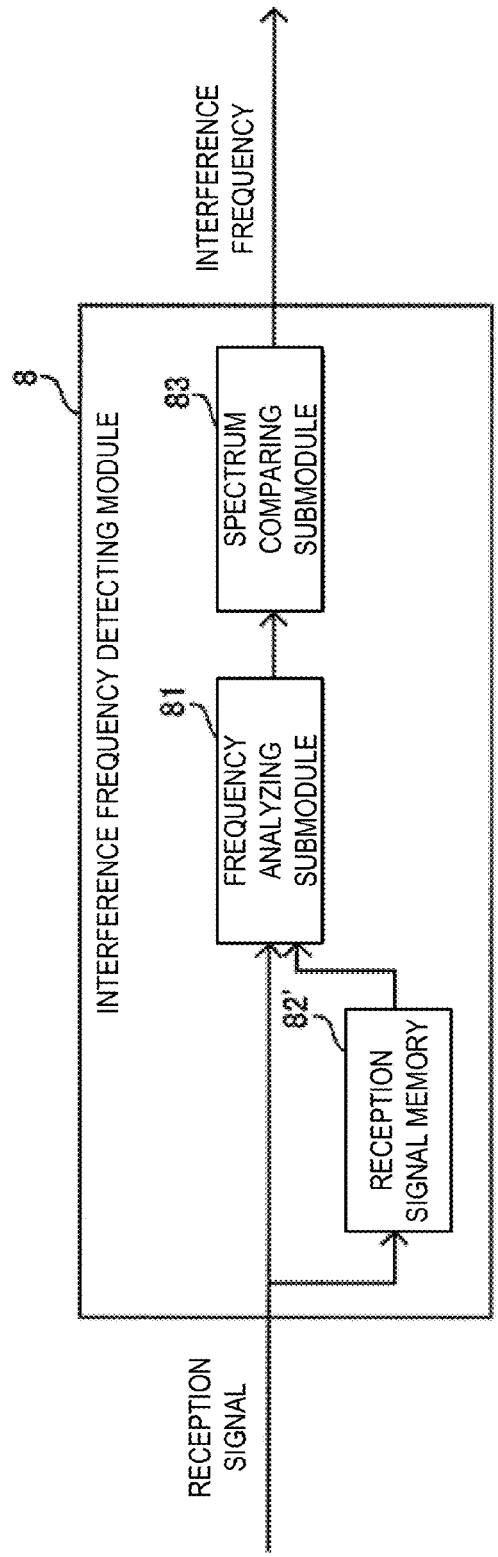
FIG. 7 is a block diagram illustrating a configuration of an interference frequency detecting module according to another embodiment of this disclosure.

(2) Further, in the above embodiment, in the interference detecting module 8, the spectrum memory 82 stores the frequency spectra; however, a reception signal memory 82' as illustrated in FIG. 7 may be provided instead of the spectrum memory 82. In this case, the reception signal memory 82' stores the reception signals for a plurality of sweeps. Next, the frequency analyzing submodule 81 performs frequency analysis for every sweep on the reception signals for the plurality of sweeps stored in the reception signal memory 82', and generates the frequency spectra for every azimuth. Further, the spectrum comparing submodule 83 detects the interference frequency similarly to the above embodiment, based on the frequency spectra generated by the frequency analyzing submodule 81.

(3) Moreover, when the interference frequency detecting module 8 specifies the interference waves, it may output, to the signal processing module 10, information regarding the sweep in which the interference waves are specified, and the signal processing module 10 may perform the interference removal by utilizing the information.

(4) Further, in the above embodiment, the spectrum comparing submodule 83 may also output to the map generating module 9 a reception intensity of the interference frequency in addition to the interference frequency itself, and the map generating module 9 may generate the frequency map by taking the intensity into consideration. By utilizing the reception intensity, for example, the radar apparatus 1 may be designed to preferentially avoid interference with another radar apparatus near the radar apparatus 1.

(5) Moreover, in the above embodiment, the central frequency of the transmission signal is designed not to overlap with the frequencies of the interference band regardless of the transmission signal of the radar apparatus 1 being the modulated pulse signal or the non-modulated pulse signal; however, it is not particularly limited to this. For example, since an interference removal is easier with the non-modulated pulse signal than the modulated pulse signal, the radar apparatus 1 may set the central frequency of the transmission signal to a frequency within the no-interference band so as not to overlap with the frequencies of the interference band, only when the transmission signal is the modulated pulse signal. Alternatively, a frequency within the no-interference band may be preferentially assigned to the modulated pulse signal and another frequency within the no-interference band which is not used for the modulated pulse signal may be assigned to the non-modulated pulse signal. Thus, in a case where the no-interference band is short, the frequencies within the no-interference band can effectively be utilized.

(6) Furthermore, in the above embodiment, the frequency map is generated based on all the interference waves; however, it is not particularly limited to this. For example, as described above, since the interference removal is easier with the non-modulated pulse signal than the modulated pulse signal, the following configuration may be adopted. Specifically, when the spectrum comparing submodule 83 specifies the interference waves, it determines the type of the interference wave between the modulated pulse signal and the non-modulated pulse signal. Only if the spectrum comparing submodule 83 determines that the interference wave is the modulated pulse signal, the frequency of the interference wave is detected and outputted to the map generating module 9. Thus, the map generating module 9 generates the frequency map by only using the frequencies of the interference waves which are the modulated pulse signals. By generating the frequency map based only on the frequencies of the interference waves which are modulated pulse signals as above, the no-interference band can be expanded, and as a result, the frequency can effectively be utilized.

Note that, the method of determining the type of the interference wave between the modulated pulse signal and the non-modulated pulse signal by the spectrum comparing submodule 83 is not particularly limited. For example, since the non-modulated pulse signal has a smaller pulse width than the modulated pulse signal, the interference wave may be determined as the non-modulated pulse signal if the pulse width of the interference wave is shorter than a predetermined value (e.g., 1 µs), and may be determined as the modulated pulse signal if the pulse width is the predetermined value or wider. Other than this method, by performing Fourier-transform on each of the interference components of the reception signals while shifting it by a few samples, if a peak frequency thereof changes as a result, the interference components may be determined as the modulated pulse signals, and if the peak frequency does not change as a result, the interference components may be determined as the non-modulated pulse signals.

Figure 8:
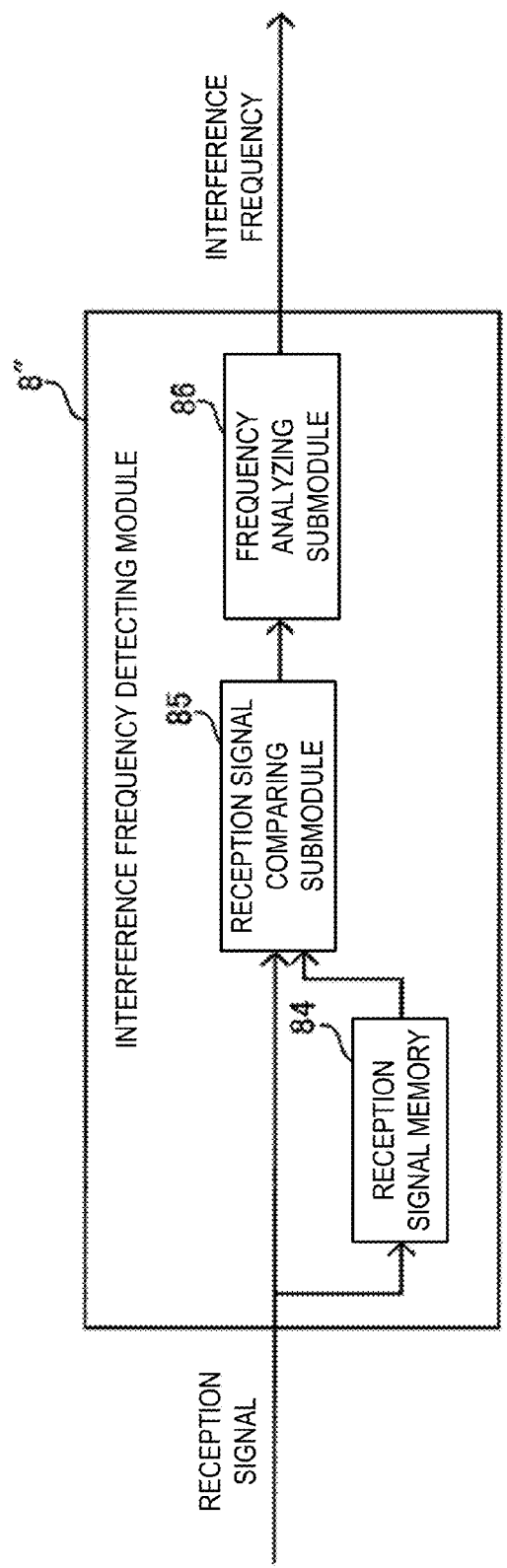
FIG. 8 is a block diagram illustrating a configuration of an interference frequency detecting module according to another embodiment of this disclosure.

(7) Further, the detecting method of the interference frequency is not limited to the above embodiment, and the interference frequency may be detected in various methods. For example, in the above embodiment, in detecting the interference frequency by the interference frequency detecting module 8, the frequency spectra are obtained by Fourier-transforming all the reception signals by the frequency analyzing submodule 81; however, the interference frequency detecting module 8 may be configured as follows so as to reduce the operation load. That is, as illustrated in FIG. 8, an interference frequency detecting module 8" includes a reception signal memory 84, a reception signal comparing submodule 85, and a frequency analyzing submodule 86. The reception signal memory 84 stores the reception signals for a plurality of sweeps from the receiver 7. The reception signal comparing submodule 85 compares the amplitudes of the reception signals between continuous sweeps, obtains correlation between the sweeps, and specifies the signals which are not in correlation with each other as the interference waves. The frequency analyzing submodule 86 only Fourier-transforms the signals corresponding to the part specified as the interference waves so as to detect the frequencies of the interference waves, and outputs the frequencies to the map generating module 9. By configuring the interference frequency detecting module 8" as above, not all the reception signals need to be Fourier-transformed, and therefore, the operation load can be reduced.

Figure 9:
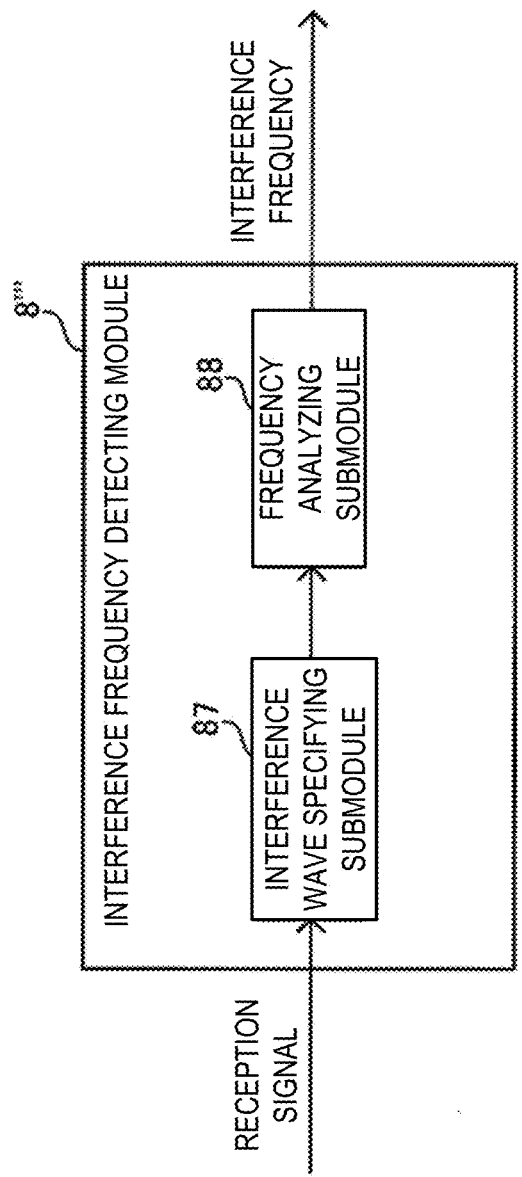
FIG. 9 is a block diagram illustrating a configuration of an interference frequency detecting module according to another embodiment of this disclosure.

(8) Moreover, the interference frequency may be detected as follows. As illustrated in FIG. 9, an interference frequency detecting module 8''' includes an interference wave specifying submodule 87 and a frequency analyzing submodule 88. The interference wave specifying submodule 87 specifies, from reception signals propagated longer than a predetermined distance, a signal having an intensity higher than a predetermined value as the interference wave and not as the echo signal, and outputs it to the frequency analyzing submodule 88. The frequency analyzing submodule 88 detects the interference frequency by Fourier-transforming the signal outputted from the interference wave specifying submodule 87, and outputs the interference frequency to the map generating module 9.

(9) Furthermore, in the above embodiment, the central frequency of the transmission signal is set by the map generating module 9; however, it is not particularly limited to this. For example, when the signal generating module 4 generates the transmission signal to be transmitted to a certain azimuth, the map generating module 9 may output the no-interference band in this azimuth to the signal generating module 4. In this case, the signal generating module 4 sets the central frequency of the transmission signal based on the no-interference band.

DESCRIPTION OF REFERENCE NUMERAL(S)

1 Radar Apparatus
8 Interference Frequency Detecting Module
9 Map Generating Module

What is claimed is:

1. A radar apparatus for transmitting a modulated pulse signal and a non-modulated pulse signal, comprising:
   an interference frequency detecting module configured to detect an interference frequency that is a frequency of an interference wave, based on reception signals containing a reflection wave caused by either one of the modulated pulse signal and the non-modulated pulse signal; and
   a map generating module configured to generate a frequency map for specifying an interference band that is a frequency band where the interference frequency exists and a no-interference band that is a frequency band where the interference frequency does not exist,
   wherein a central frequency of at least one of the modulated pulse signal and the non-modulated pulse signal is set based on the frequency map, and
   wherein a frequency within the no-interference band is assigned to the modulated pulse signal before the non-modulated pulse signal.

2. The radar apparatus of claim 1, wherein only the central frequency of the modulated pulse signal is set based on the frequency map.

3. The radar apparatus of claim 1, wherein the central frequency of at least one of the modulated pulse signal and the non-modulated pulse signal is set to a frequency within the no-interference band.

4. The radar apparatus of claim 1, wherein the interference frequency detecting module determines a type of the interference wave between the modulated pulse signal and the non-modulated pulse signal.

5. The radar apparatus of claim 4, wherein the map generating module generates the frequency map by using the interference wave that is the modulated pulse signal.

6. The radar apparatus of claim 1, wherein the interference frequency detecting module generates a frequency spectrum for every sweep based on the reception signal, and detects frequencies that are not in correlation with each other as the interference frequencies by comparing the frequency spectra between continuous sweeps with each other.

7. A method of reducing interference in a radar apparatus for transmitting a modulated pulse signal and a non-modulated pulse signal, comprising:
   (a) detecting an interference frequency that is a frequency of an interference wave, based on reception signals containing a reflection wave caused by either one of the modulated pulse signal and the non-modulated pulse signal; and
   (b) generating a frequency map for specifying an interference band that is a frequency band where the interference frequency exists and a no-interference band that is a frequency band where the interference frequency does not exist,
   wherein a central frequency of at least one of the modulated pulse signal and the non-modulated pulse signal is set based on the frequency map, and
   wherein a frequency within the no-interference band is assigned to the modulated pulse signal before the non-modulated pulse signal.

* * * * *